329
United States Patent Office 3,450,775
Patented June 17, 1969

3,450,775
DIMETHYLETHYLADAMANTANOL
Abraham Schneider, Overbrook Hills, Pa., assignor to Sun Oil Company, Philadelphia, Pa., a corporation of New Jersey
No Drawing. Continuation-in-part of application Ser. No. 395,557, Sept. 10, 1964. This application Nov. 30, 1966, Ser. No. 597,885
Int. Cl. C07c $35/22$
U.S. Cl. 260—617    1 Claim

ABSTRACT OF THE DISCLOSURE 1-hydroxy-3,5-dimethyl-7-ethyladamantane, a new compound normally obtained as white crystals with a melting point of 82.5–83.5° C. It exhibits antiviral activity for eradication of plant virus and also antiviral activity in animal tests.

Cross references to related applications

This application is a continuation-in-part of copending application Ser. No. 394,557, filed Sept. 10, 1964, now Patent No. 3,356,740, which discloses and claims a method of preparing 1-hydroxy-3,5-dimethyl-7-ethyladamantane as well as other hydroxyalkyladamantanes.

Background of the invention

The invention relates to a specific alkyladamantanol, namely, 1-hydroxy-3,5-dimethyl-7-ethyladamantane, as a new and useful compound.

The parent hydrocarbon corresponding to this alkyladamantanol, i.e., 1,3-dimethyl-5-ethyladamantane, is known and can be made by isomerizing $C_{14}$ tricyclic perhydroaromatics as disclosed, for example, in United States Patent No. 3,275,700.

The homologue, 1-hydroxyadamantane, is known and its preparation by oxidation of adamantane has been described in J. Org. Chem., vol. 26, pp. 2207–2212 (1961). A typical procedure comprised dissolving adamantane in a mixture of benzene and glacial acetic acid, employing cobalt acetate and di-t-butylperoxide together as the catalyst, and oxidizing the mixture by contacting it at 140–145° C. with air at a pressure of 800 p.s.i.g. for 4 hours.

Summary of the invention

The 1-hydroxy-3,5-dimethyl-7-ethyladamantane in substantially pure form is a white crystalline solid melting at about 82.5–83.5° C. It exhibits antiviral activity as an eradicant against plant viruses and also has shown a wide spectrum of antiviral activity in mice.

Description

The compound of the invention can be prepared by oxidizing 1,3-dimethyl-5-ethyladamantane by means of a free oxygen-containing gas or chromic acid, whereby oxidation occurs only at the unsubstituted bridgehead position in the nucleus of the parent hydrocarbon.

In one suitable method of preparation 1,3-dimethyl-5-ethyladamantane is contacted in the absence of a solvent with air at a temperature in the range of 120°–200° C., the pressure of the gas being less than 50 p.s.i.g. and more preferably being about atmospheric. A small amount of a soluble oxidation catalyst is used, which catalyst is an organic salt of a metal of the group consisting of cobalt, manganese, iron and magnesium. This is the sole catalytic agent used to promote the oxidation. Only more or less trace amounts of the catalyst are required such as from 0.01% to 0.2% by weight of the mixture, although considerably larger amounts can be used. Contacting of the air with the alkyladamantane at the specified temperature is continued until a suitable degree of conversion has been obtained. The desired 1-hydroxy derivative is the main product of the reaction. Generally a minor but substantial amount of ketodimethylethyladamantane along with a small amount of higher boiling oxygenated product is obtained. The 1-hydroxy-3,5-dimethyl-7- ethyladamantane can be recovered from the reaction mixture in any suitable manner, e.g., by distillation and/or fractional crystallization.

Another suitable preparative procedure involves the use of chromic acid in aqueous acetic acid as oxidizing agent. In this method the aqueous acetic acid solvent preferably has an acetic acid content in the range of 70–90% by weight, chromium trioxide is added thereto to form 2–4 moles of chromic acid per mole of the parent hydrocarbon to be reacted, and the latter is added to and reacted with the chromic acid solution at a temperature in the range of 70–100° C. Only small amounts of by-products such as keto and keto-hydroxy derivatives are formed in this method.

Examples 1 and 2 below illustrate the preparation of 1-hydroxy-3,5-dimethyl-7-ethyladamantane from the parent hydrocarbon (herein referred to as DMEA):

EXAMPLE 1

In this example air was used to oxidize DMEA in the absence of any solvent. The procedure involved blowing air at about atmospheric pressure through the charge hydrocarbon containing about 0.05% of dissolved cobalt naphthenate while maintaining the temperature in the range of 173–203° C. More specifically the hydrocarbon was blown with air for 38 minutes and a sample (No. 1) was taken, then was blown for 92 more minutes and another sample (No. 2) was taken, and finally was blown for 90 additional minutes and another sample (No. 3) was obtained. The samples were analyzed by vapor phase chromatography in conjunction with infrared spectra. Table I shows the treating conditions and the results obtained.

TABLE I

| Sample No. | 1 | 2 | 3 |
|---|---|---|---|
| Reaction temp., ° C | 180 | 173–194 | 190–203 |
| Cumulative time, min | 38 | 130 | 220 |
| Composition of product, wt. percent: | | | |
| DMEA | 85.4 | 63.9 | 31.7 |
| 1-hydroxy DMEA | 10.7 | 26.4 | 45.6 |
| Keto DMEA [1] | 3.9 | 9.8 | 15.9 |
| Higher boiling products | | | 6.8 |

[1] Included at least three isomers.

From the data on the final sample it can be seen that the conversion of DMEA was 68.3% and that the 1-hydroxy - 3,5-dimethyl-7-ethyladamantane constituted about two-thirds of the total oxygenated products.

EXAMPLE 2

Ten grams (0.052 mole) of 1-ethyl-3,5-dimethyladamantane were added in 1 ml. increments to a stirred solution of 15.4 g. (0.154 mole) chromium trioxide in 15 ml. water and 85 ml. glacial acetic acid at 75° C. When the addition was complete, the solution was stirred and heated at 85–95° C. for 15 hours. The aqueous solution was extracted with ether, the ether extracts were washed with aqueous sodium carbonate followed by water and then were dried over magnesium sulfate. The ether was evaporated to yield 6 g. of crude white solid. The solid was recrystallized twice from acetone to yield 5.4 g. (50% yield) of white needles, melting point 82.5–83.5° C. The product was identified by means of VPC, IR, NMR and mass spectroscopy.

EXAMPLE 3

The 1-hydroxy-3,5-dimethyl-7-ethyladamantane (herein 1-OH-DMEA) prepared as in Example 2 was tested for antiviral activity against Tobacco Mosaic Virus using hothouse grown tobacco plants as hosts. Two types of tests were made as follows:

(1) As Protectant.—The tobacco plants first were sprayed with a standard amount of 1-OH-DMEA dissolved in acetone, to which solution a small amount of finely divided carborundum had been added for purpose of rupturing the plant cell tissues. After drying, the plants were sprayed with a solution of the virus. A set of control plants was treated in the same manner except that the OH-DMEA was not included in treatment. Observations of the treated and control plants did not show any antiviral protective action for solutions up to 500 p.p.m. of the compound.

(2) As Eradicant.—In these runs tobacco plants were brushed with finely divided carborundum to rupture the tissues and then were inoculated by spraying on the virus solution. After the virus infection had become well established, a set of the plants was then sprayed with an acetone solution of 1-OH-DMEA in a concentration of 500 p.p.m. Subsequent observation of these plants as compared to control plants not so sprayed showed 67% eradication of the viral infection. While complete eradication was not demonstrated, this result is distinctly beneficial since heretofore no compound that is effective as a plant virus eradicant appears to have been known.

The foregoing results indicate that while the subject compound does not show antiviral activity as a plant protectant, it unexpectedly has utility for eradicating virus infections already occurring.

EXAMPLE 4

Various virology tests, both in vivo with mice and in vitro, were carried out for purpose of ascertaining and comparing any potential activity of 1-OH-DMEA with the known homologue, 1-adamantanol (designated 1-OH-A). Also tests on two other monools of alkyladamantanes were included. These homologues were made by chromic acid oxidation of the corresponding alkyladamantane hydrocarbons and specifically were 1-hydroxy-3-ethyl-adamantane (1-OH-EA) and 1-hydroxy-3,5,7-trimethyladamantane (1-OH-TMA). Several different viruses as listed in Table II were employed. The results are given in Table II in terms of the number of tests of each type which showed clearly significant antiviral activity in comparison with the total number of tests of such type run.

TABLE II

| Compound tested | Virus used | Type of test | Dosage variation, mg./kg. of mouse | No. of tests Total | Significant activity shown |
|---|---|---|---|---|---|
| 1-OH-DMEA | Herpes Simplex | In vivo | 0.03–3.0 | 18 | 7 |
| 1-OH-DMEA | Columbia SK Polio | do | 0.3–3.0 | 10 | 3 |
| 1-OH-DMEA | Influenza NWS | do | 0.3–3.0 | 4 | 2 |
| 1-OH-DMEA | Vaccinia (IHD) | do | 0.3–3.0 | 6 | 1 |
| 1-OH-A | Columbia SK Polio | do | 0.06–0.9 | 5 | 0 |
| 1-OH-A | Influenza NWS | do | 0.2–2.0 | 16 | 13 |
| 1-OH-A | Semliki Forest | do | 1.8–9.0 | 3 | 0 |
| 1-OH-A | Coxsackie BI (Conn 5) | do | 0.09–0.3 | 2 | 0 |
| 1-OH-A | Mouse Hepatitis | do | 0.05–0.1 | 2 | 0 |
| 1-OH-A | Herpes Simplex | In vitro | | 5 | 0 |
| 1-OH-A | Vaccinia (CL) | do | | 12 | 0 |
| 1-OH-EA | Herpes Simplex | In vivo | 0.3–3.0 | 4 | 0 |
| 1-OH-EA | Columbia SK Polio | do | 0.1–3.0 | 4 | 0 |
| 1-OH-EA | Influenza NWS | do | 0.3–3.0 | 4 | 1 |
| 1-OH-TMA | Herpes Simplex | do | 0.3–4.0 | 4 | 0 |
| 1-OH-TMA | Columbia SK Polio | do | 0.3–3.0 | 2 | 0 |
| 1-OH-TMA | Influenza NWS | do | 0.3–3.0 | 2 | 0 |

The results in Table II indicate that 1-hydroxy-3,5-dimethyl-7-ethyladamantane has significant activity against various viruses in animal tests. In contrast the hydroxy derivative of adamantane, 1-ethyladamantane and 1,3,5-trimethyladamantane failed to show any wide spectrum of activity. The 1-adamantanol did show good activity against the influenza virus but otherwise had substantially no antiviral effect.

I claim:

1. 1-hydroxy-3,5-dimethyl-7-ethyladamantane.

References Cited

UNITED STATES PATENTS 3,356,740   12/1967   Schneider _____ 260—617

LEON ZITVER, *Primary Examiner.*

T. G. DILLAHUNTY, *Assistant Examiner.*